US012601596B2

(12) United States Patent
Grabbe et al.

(10) Patent No.: US 12,601,596 B2
(45) Date of Patent: Apr. 14, 2026

(54) ESTIMATION OF TARGET LOCATION AND SENSOR MISALIGNMENT ANGLES

(71) Applicant: L3Harris Technologies, Inc., Melbourne, FL (US)

(72) Inventors: Michael Thomas Grabbe, Sachse, TX (US); Michael Lindsey Mahaffey, Austin, TX (US); Michael Duane Sapp, Garland, TX (US); Brian Joseph Holden, St. Paul, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 166 days.

(21) Appl. No.: 17/496,453

(22) Filed: Oct. 7, 2021

(65) Prior Publication Data

US 2023/0115712 A1 Apr. 13, 2023

(51) Int. Cl.
*G01C 21/20* (2006.01)
*G01C 21/00* (2006.01)

(52) U.S. Cl.
CPC ........... *G01C 21/20* (2013.01); *G01C 21/005* (2013.01)

(58) Field of Classification Search
CPC .............................. G01C 21/20; G01C 21/005
USPC ........................................................ 701/300
See application file for complete search history.

(56) References Cited

U.S. PATENT DOCUMENTS

| | | | | | |
|---|---|---|---|---|---|
| 4,232,313 | A | * | 11/1980 | Fleishman | .............. G01S 13/93 342/36 |
| 4,954,837 | A | * | 9/1990 | Baird | ................... G01C 21/005 342/458 |
| 5,912,642 | A | * | 6/1999 | Coffin | ................... H01Q 1/185 342/359 |
| 8,024,119 | B2 | * | 9/2011 | Zeng | ................. G01C 21/1654 702/95 |

(Continued)

FOREIGN PATENT DOCUMENTS

| | | | | | |
|---|---|---|---|---|---|
| CN | 112197761 | A | * | 1/2021 | ........... G01C 21/005 |
| WO | WO-2014069097 | A1 | * | 5/2014 | ........... G01S 17/936 |

OTHER PUBLICATIONS

Hsieh, SC, et al., "Airborne Attitude/Ground Target Location Determinations Using Unscented Kalman Filter", 2004 IEEE Aerospace Conference Proceedings (IEEE Cat. No. 04TH8720), vol. 3, pp. 1561-1568 (2004).

*Primary Examiner* — Helal A Algahaim
*Assistant Examiner* — Merritt E Levy
(74) *Attorney, Agent, or Firm* — Edell, Shapiro & Finnan, LLC

(57) ABSTRACT

Data indicative of a line of sight to a target is obtained from a sensor mounted on an aircraft. Data indicative of an orientation of the aircraft relative to the Earth is obtained from a navigation system associated with the aircraft. An expression is generated that couples a first variable indicative of misalignment of an orientation of the sensor and the orientation of the aircraft and a second variable indicative of the location of the target relative to the Earth. The first (Continued)

variable and second variable are determined using the data indicative of the line of sight from the sensor to the target and the expression coupling the first variable and the second variable. The misalignment of the orientation of the sensor and the orientation of the aircraft is compensated for using the first variable. The location of the target relative to the Earth is determined using the second variable.

8 Claims, 9 Drawing Sheets

(56) References Cited

U.S. PATENT DOCUMENTS

| | | | | |
|---|---|---|---|---|
| 8,265,817 | B2 * | 9/2012 | Tener | G01S 17/875 |
| | | | | 701/512 |
| 9,091,552 | B2 | 7/2015 | Liu | |
| 10,613,114 | B2 * | 4/2020 | Hua | G01C 19/00 |
| 10,989,539 | B1 * | 4/2021 | Frey, Jr. | G01C 21/18 |

| | | | | |
|---|---|---|---|---|
| 2005/0060092 | A1 * | 3/2005 | Hablani | B64G 1/369 |
| | | | | 701/472 |
| 2005/0177307 | A1 * | 8/2005 | Greenfeld | G01C 11/025 |
| | | | | 701/6 |
| 2010/0036612 | A1 * | 2/2010 | Vance | B64G 1/242 |
| | | | | 382/103 |
| 2011/0149266 | A1 * | 6/2011 | Motzer | G01S 5/16 |
| | | | | 342/463 |
| 2012/0257050 | A1 * | 10/2012 | Simon | G01S 11/12 |
| | | | | 348/135 |
| 2014/0210663 | A1 * | 7/2014 | Metzler | G01S 19/07 |
| | | | | 342/357.34 |
| 2015/0276923 | A1 * | 10/2015 | Song | G01S 13/931 |
| | | | | 702/97 |
| 2016/0012289 | A1 * | 1/2016 | Petit | G06T 7/60 |
| | | | | 348/144 |
| 2019/0302276 | A1 * | 10/2019 | Sandford | G01S 19/485 |
| 2020/0082614 | A1 * | 3/2020 | Xu | B64C 39/024 |
| 2020/0182957 | A1 * | 6/2020 | Günzel | G01S 17/89 |
| 2020/0324898 | A1 * | 10/2020 | Youmans | G06V 20/176 |
| 2021/0341599 | A1 * | 11/2021 | Rozewicz | G01S 13/931 |

* cited by examiner

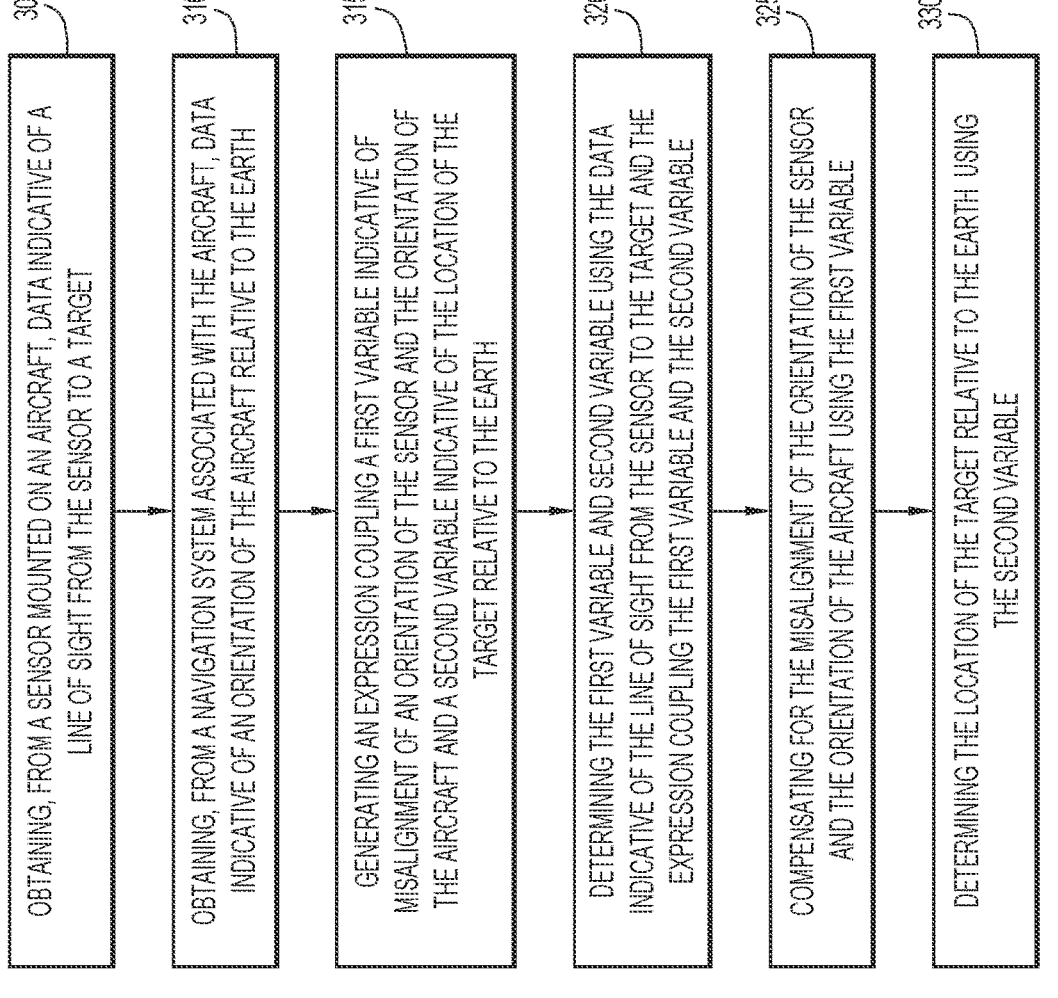

305

OBTAINING, FROM A SENSOR MOUNTED ON AN AIRCRAFT, DATA INDICATIVE OF A LINE OF SIGHT FROM THE SENSOR TO A TARGET

310

OBTAINING, FROM A NAVIGATION SYSTEM ASSOCIATED WITH THE AIRCRAFT, DATA INDICATIVE OF AN ORIENTATION OF THE AIRCRAFT RELATIVE TO THE EARTH

315

GENERATING AN EXPRESSION COUPLING A FIRST VARIABLE INDICATIVE OF MISALIGNMENT OF AN ORIENTATION OF THE SENSOR AND THE ORIENTATION OF THE AIRCRAFT AND A SECOND VARIABLE INDICATIVE OF THE LOCATION OF THE TARGET RELATIVE TO THE EARTH

320

DETERMINING THE FIRST VARIABLE AND SECOND VARIABLE USING THE DATA INDICATIVE OF THE LINE OF SIGHT FROM THE SENSOR TO THE TARGET AND THE EXPRESSION COUPLING THE FIRST VARIABLE AND THE SECOND VARIABLE

325

COMPENSATING FOR THE MISALIGNMENT OF THE ORIENTATION OF THE SENSOR AND THE ORIENTATION OF THE AIRCRAFT USING THE FIRST VARIABLE

330

DETERMINING THE LOCATION OF THE TARGET RELATIVE TO THE EARTH USING THE SECOND VARIABLE

BIH-Defined CTP (1984.0)

$Z_{WGS_{84}}$

410

Earth's Center of Mass

405

425

$Y_{WGS_{84}}$

BIH-Defined Zero Meridian (1954.0)

420

$X_{WGS_{84}}$

415

WGS$_{84}$ Reference Frame

400

ESTIMATION OF TARGET LOCATION AND SENSOR MISALIGNMENT ANGLES

TECHNICAL FIELD

The present disclosure relates to the determination of a target location and the determination of misalignment between the orientation of a sensor and the orientation of the aircraft on which the sensor is arranged.

BACKGROUND

Passive geo-location of ground target emitters is performed by surveillance aircraft using Line-of-Sight (LOS) angle measurements provided by a sensor mounted on the aircraft. In order to completely specify the LOS from the sensor to the target, the LOS must be resolved into two angles, such as an azimuth angle and an elevation angle. For some sensors, such as a linear antenna arrays, only azimuth is determined. In this case, it is common to refer to the azimuth angle as Angle of Arrival (AOA) and to perform geo-location using Direction of Arrival (DOA), which is a transformation of AOA into a plane tangent to the Earth's surface at some specified point within the area of operation. Geo-location performance improves when both azimuth and elevation are provided.

In order to use LOS angles for geo-location, the angles must be transformed from a coordinate frame attached to the sensor to a coordinate frame attached to the Earth. Many passive sensors do not contain a navigation system and therefore are not able to directly measure their orientation relative to the Earth. In this case, the transformation of LOS angles requires that a coordinate frame defined by the aircraft's navigation system, such as the aircraft body frame, be used as an intermediate frame between the sensor and the Earth. The aircraft's navigation system typically provides an accurate measurement of the orientation of the aircraft body relative to the Earth. However, the orientation of the sensor relative to the aircraft body may not be well known. Any errors in the assumed sensor mounting angles on the aircraft will produce errors in the transformed LOS angles used for geo-location. It is not difficult to envision a scenario where sensor misalignment angles of several degrees exist, which would result in significant error in the target location estimate.

BRIEF DESCRIPTION OF THE DRAWINGS

FIG. 3 is a flowchart illustrating a process flow for providing the target location and sensor misalignment estimation techniques of the present disclosure, according to an example embodiment.

DESCRIPTION OF EXAMPLE EMBODIMENTS

Overview

Example embodiments of the techniques of the present disclosure provide for methods, apparatuses and computer executable mediums that implement operations providing for the simultaneous computation of sensor attitude and target location, using only line of sight angle measurements. According to example embodiments, data indicative of a line of sight to a target is obtained from a sensor mounted on an aircraft. Data indicative of an orientation of the aircraft relative to the Earth is obtained from a navigation system associated with the aircraft. An expression is generated that couples a first variable indicative of misalignment of an orientation of the sensor and the orientation of the aircraft and a second variable indicative of the location of the target relative to the Earth. The first variable and second variable are determined using the data indicative of the line of sight from the sensor to the target and the expression coupling the first variable and the second variable. The misalignment of the orientation of the sensor and the orientation of the aircraft is compensated for using the first variable. The location of the target relative to the Earth is determined using the second variable.

EXAMPLE EMBODIMENTS

Figures 1A, 2A:
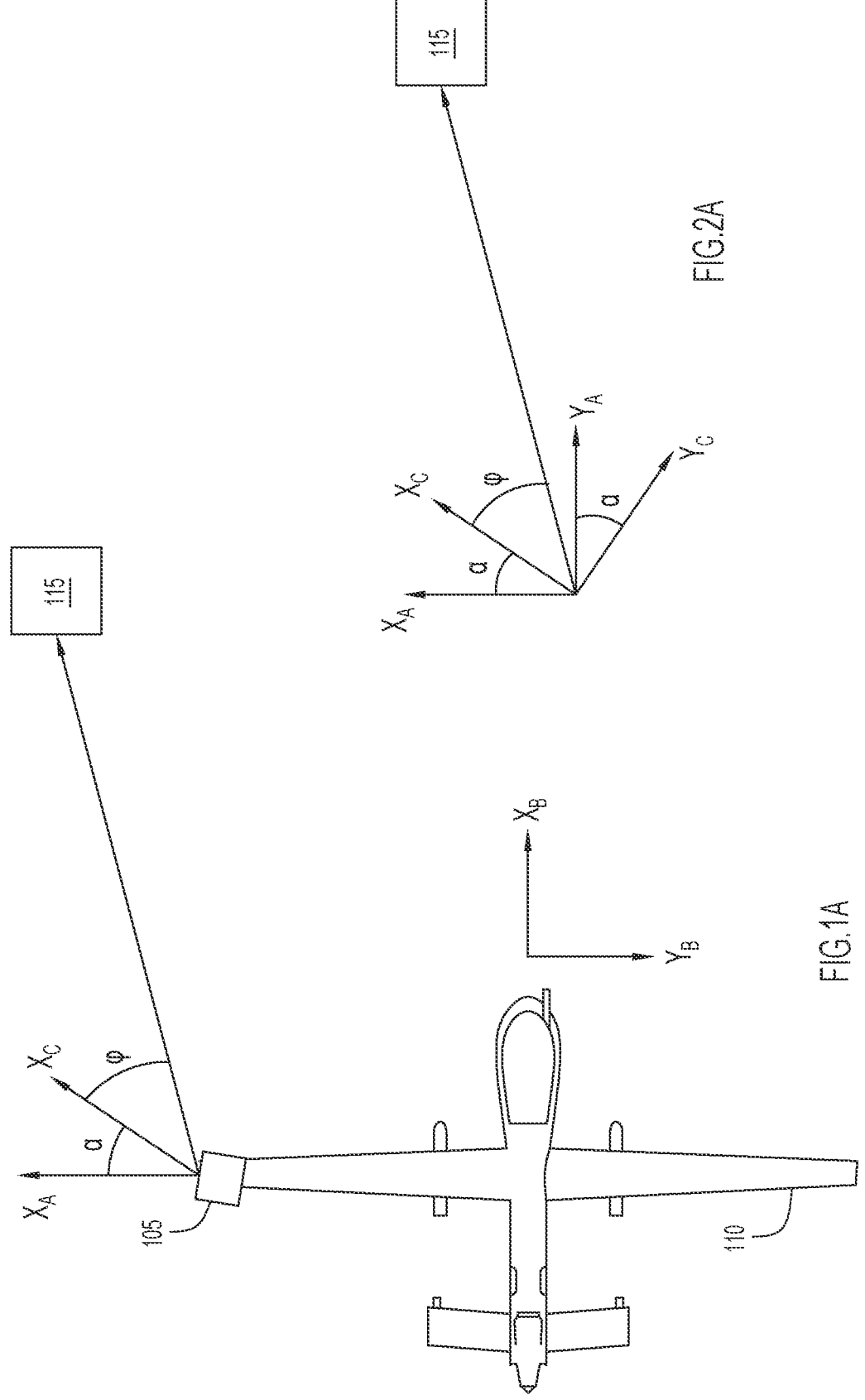
FIG. 1A-C are overhead, side and front views, respectively, of a sensor mounted to an aircraft, according to an example embodiment.
FIGS. 2A-C are illustrations of the orientation of the sensor of FIGS. 1A-C relative to the orientation of the aircraft of FIGS. 1A-C, according to an example embodiment.
Figure 2B:
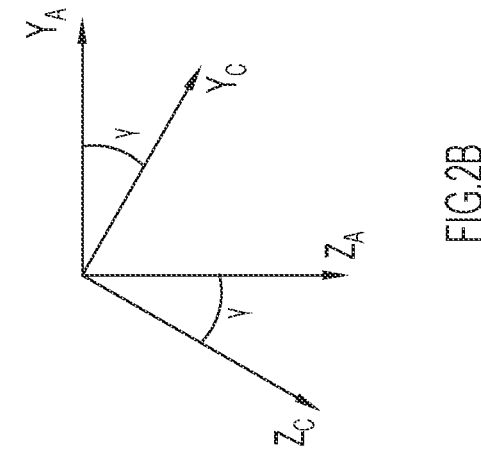
Figure 1B:
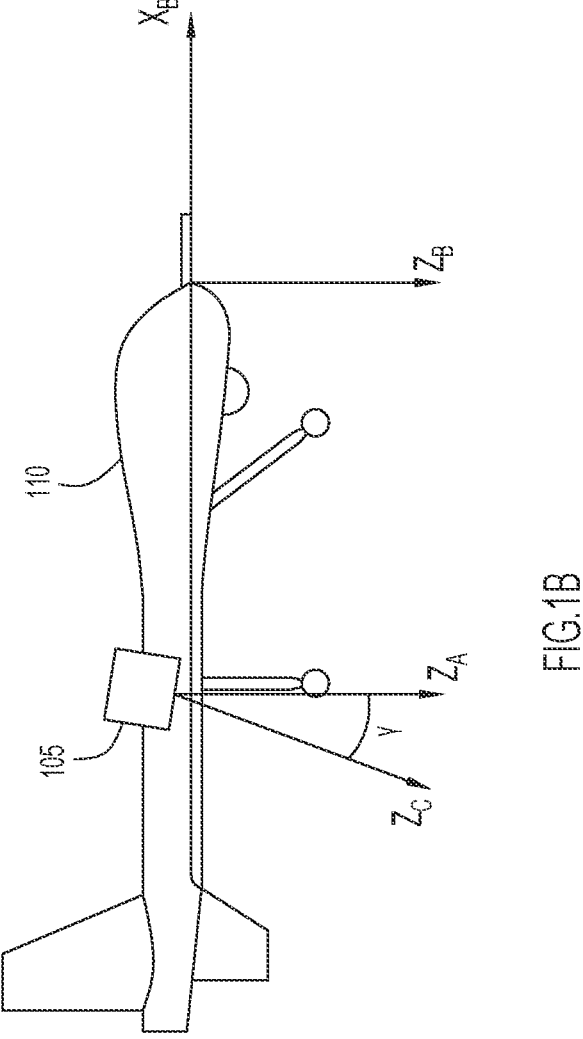
Figure 2C:
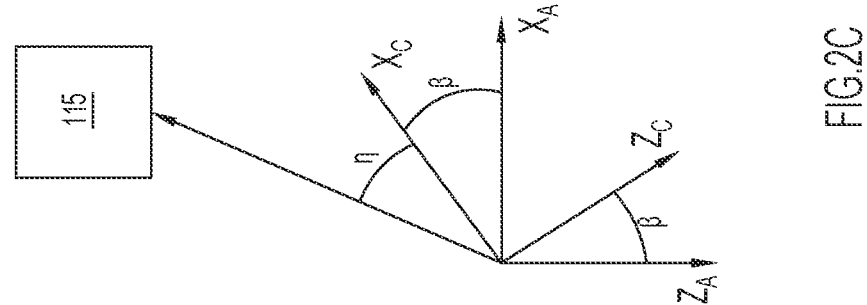
Figure 1C:
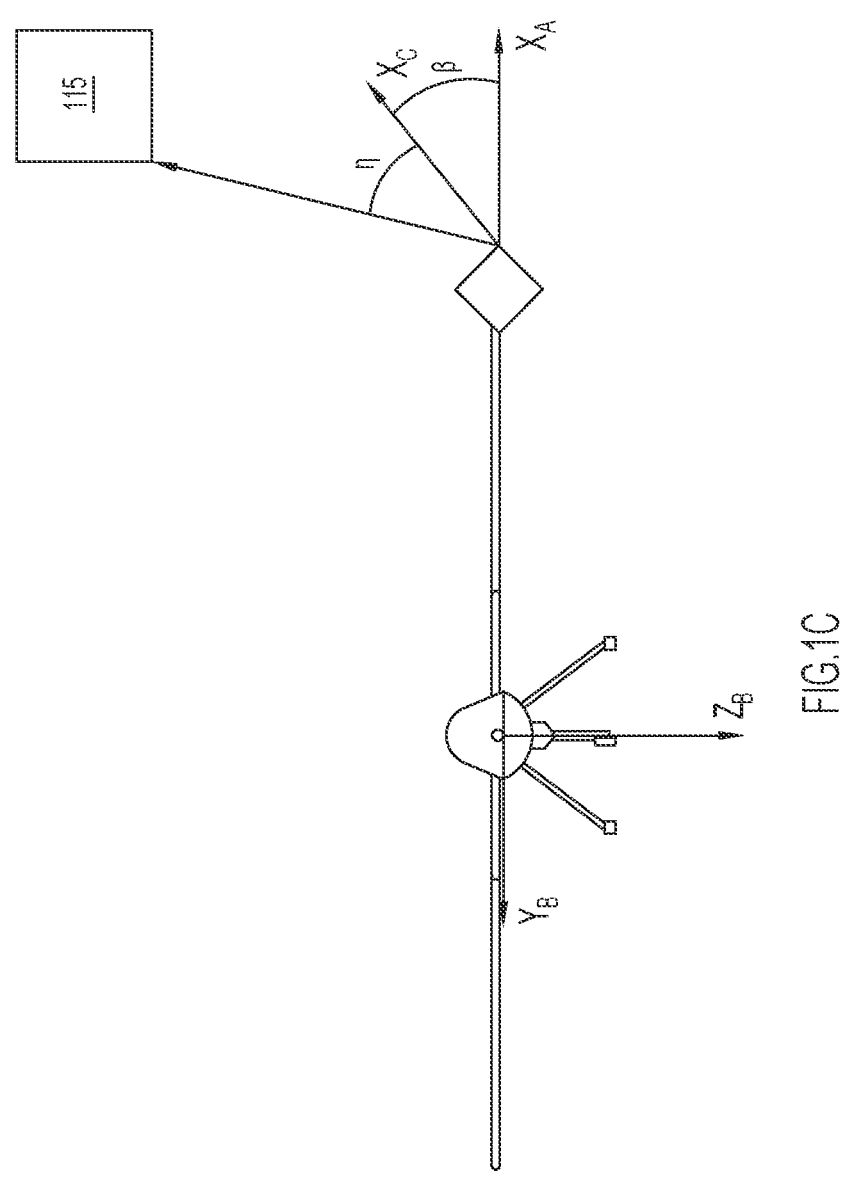

Provided for herein are techniques for simultaneous estimation of target location and sensor misalignment angles. As illustrated with reference to FIG. 1A-C, a sensor 105 may be misaligned relative to the airframe of aircraft 110. Specifically, FIG. 1A shows aircraft 110 from a top-down view, FIG. 1B shows aircraft 110 from the side, and FIG. 1C shows aircraft 110 from the front. FIGS. 2A-C show coordinates relative to the senor and the aircraft. Specifically, coordinates from three different 3-dimensional coordinate systems are illustrated. A first coordinate system comprising the axes "$X_A$," "$Y_A$" and "$Z_A$" are the abscissa, ordinate and applicate of the assumed sensor alignment. A second coordinate system comprising the axes "$X_C$," "$Y_C$" and "$Z_C$" are the abscissa, ordinate and applicate of the actual sensor alignment. Finally, a third coordinate system comprising the axes "$X_B$," "$Y_B$" and "$Z_B$" are the abscissa, ordinate and applicate of the aircraft 110.

Sensor 105 may be embodied as an antenna array, an optical sensor, an infrared sensor, or other types of sensors known to the skilled artisan. The attitude (orientation) of a sensor pod attached to an aircraft, such as sensor 105, is rarely known exactly. For example, it may be assumed that the sensor coordinate frame is aligned with the aircraft body forward-right-down frame, but the actual sensor yaw, pitch, and roll angles may differ from those of the aircraft by several degrees. Even if the sensor pod mounting angles are known exactly at some point, they may change slightly each time the pod is removed and reinstalled on the aircraft. These misalignments may degrade performance if the sensor provides Direction Finding (DF) angle measurements for geolocation. The typical result of these misalignments is not an increase in the size of the error ellipse, but an increase in miss distance and a lack of containment by the error ellipse.

As illustrated in FIG. 1A, the orientation of sensor 105 is purposefully rotated 900 relative to that of aircraft 110, as illustrated via the difference in orientation of axis "$X_A$" (the assumed x-axis associated with sensor 105) and axis "$X_B$" (the x-axis associated with aircraft 110). In addition to the intended 90° rotation between the orientations of sensor 105 and aircraft 110, sensor 105 may be misaligned relative to aircraft 110, for the reasons explained above. This misalignment introduces additional rotation between the axes associated with sensor 105 and aircraft 110. FIGS. 1A and 2A illustrate a first misalignment between the assumed x-axis "$X_A$" of sensor 105 and the actual x-axis "$X_C$" of the sensor 105 as indicated by the misalignment angle $\alpha$. As shown in FIGS. 1A and 2A, the misalignment angle $\alpha$ is a misalignment of the yaw of the sensor 105. Accordingly, the misalignment between the assumed y-axis "$Y_A$" of sensor 105 and the actual y-axis "$Y_C$" of sensor 105 also exhibits this misalignment angle of $\alpha$.

FIGS. 1B and 2B illustrate a misalignment between the assumed z-axis "$Z_A$" of sensor 105 and the actual z-axis "$Z_C$" of the sensor 105, which is indicated by the misalignment angle $\gamma$. As shown in FIGS. 1B and 2B, the misalignment angle $\gamma$ is a misalignment of the roll of the sensor 105. Accordingly, the misalignment between the assumed y-axis "$Y_A$" of sensor 105 and the actual y-axis "$Y_C$" of sensor 105 also exhibits this misalignment angle of $\gamma$.

FIGS. 1C and 2C illustrate a second misalignment between the assumed x-axis "$X_A$" of sensor 105 and the actual x-axis "$X_C$" of the sensor 105, which is indicated by a misalignment angle $\beta$. As shown in FIGS. 1C and 2C, the misalignment angle $\beta$ is a misalignment of the pitch of the sensor 105. Accordingly, the misalignment between the assumed z-axis "$Z_A$" of sensor 105 and the actual z-axis "$Z_C$" of sensor 105 also exhibits this misalignment angle of $\beta$.

Accordingly, when sensor 105 is used to determine an azimuthal angle $\varphi$ to target 115 (as illustrated in FIGS. 1A and 2A) and an elevation angle $\eta$ to target 115 (as illustrated in FIGS. 1C and 2C), the misalignment between the assumed orientation of sensor 105 and the actual orientation of sensor 105 may need to be accounted for to ensure an accurate determination of the location of target 115. Specifically, the azimuthal angle $\varphi$ is assumed to be measured relative to the assumed x-axis of the sensor $X_A$. Accordingly, the misalignment angle $\alpha$ is an additive error when $\varphi$ is used for geolocation of target 115, as illustrated in FIG. 1A. Similarly, elevation angle $\eta$ is also assumed to be measure relative to the assumed x-axis of the sensor $X_A$. Therefore, the misalignment angle $\beta$ is an additive error when $\eta$ is used for geolocation.

According to related art techniques, the misalignment angles $\alpha$, $\beta$ and $\gamma$ may be determined through test flights of aircraft 110 and using sensor 105 to detect the location of a target 115 with a known location. If the location and orientation of the aircraft 110 are known and the location of the target 115 is known, then the misalignment angles $\alpha$, $\beta$ and $\gamma$ may be determined. According to other related art techniques, optical techniques are used to align the orientation of sensor 105 with that of aircraft 110 while aircraft 110 is on the ground. Both of these techniques are costly in terms of time and/or money used in the flights and alignment processes. The techniques of the present disclosure may improve upon these related art techniques by eliminating the need to perform such test flights or on-ground alignment procedures.

According to the techniques of the present disclosure, the misalignment of a sensor orientation is calculated using the same expression as that used to determine the location of a target from the data acquired from the sensor. Using the example described above with reference to FIGS. 1A-C and 2A-C above, the misalignment angles $\alpha$, $\beta$ and $\gamma$ may be determined from an expression that relates these misalignment angles to data indicative of the location of the target in an Earth-centric or Earth-fixed coordinate system using the data acquired from the sensor 105.

An example process for implementing the techniques of the present disclosure is illustrated in the flowchart 300 of FIG. 3. Flowchart 300 begins in operation 305 where sensor data is obtained from a sensor mounted on an aircraft. The sensor data is indicative of a line of sight from the sensor to the target. For example, the sensor data may be indicative of an azimuthal angle and an elevation angle of the target relative to the sensor, as discussed with reference to FIGS. 1A-C and 2A-C, above. Operation 305 may include obtaining sensor data from the sensor as the aircraft travels through the air, and therefore, the sensor data acquired in operation 305 may include line of sight data from the sensor to the target at a number of different locations in space and time.

In operation 310, data indicative of the orientation of the aircraft relative to Earth may be acquired from a navigation system associated with the aircraft. For example, the location and orientation of the aircraft may be well known according to, for example, a Global Positioning System (GPS) device and an inertial measurement unit (IU) associated with the aircraft, or another system, such as a radar tracking system that monitors the location of the aircraft. Accordingly, this location and orientation data may be obtained from such GPS, IMU, and/or aircraft tracking systems. Aircraft location and orientation data may be obtained that corresponds to the line of sight data obtained in operation 305. For example, each time the sensor acquires line sight data to the target in operation 305, corresponding aircraft orientation and location data may be acquired in operation 310.

In operation 315, an expression is generated in which a first variable indicative of misalignment of an orientation of the sensor relative to the orientation of the aircraft is coupled to a second variable indicative of the target relative to the Earth. According, to example embodiments, the expression generated in operation 315 may be embodied as an expression generated from transforming a location of the target relative to a coordinate system centered on the aircraft to an Earth-centric and/or Earth-fixed coordinate system. According to the even more specific example embodiments described below, the expression generated in operation 315 may be embodied as an objective function minimized using numerical methods, such as an Iterated Least-Square (ILS) method or a Kalman filter method. Additionally, while operation 315 recites a single first variable and a single second variable, it is understood by the skilled artisan that the expression generated in operation 315 may be embodied using multiple variables. For example, the expression generated in operation 315 may include multiple variables that are indicative of misalignment of an orientation of the sensor and the orientation the aircraft, such as the misalignment variables $\alpha$, $\beta$ and $\gamma$, described above with reference to FIGS. 1A-C and 2A-C. Similarly, the expression generated in operation 315 may include multiple variables that are indicative of the location of the target relative to the Earth, such as World Geodetic System 1984 (WGS84) longitude and geodetic latitude values.

In operation 320, the first variable and the second variable are determined using the data indicative of the line of sight from the sensor to the target and the expression coupling the first variable and the second variable. As suggested in the discussion above with respect to operation 315, operation 320 may include determining a plurality of variables indicative of misalignment of the orientation of the sensor and the orientation of the aircraft and a plurality of variables indicative of the location of the target relative to the Earth. As also noted above, operation 310 may be carried out using an ILS method or a Kalman filter method.

In operation 325, the misalignment of the orientation of the sensor and the orientation of the aircraft is compensated for using the first variable. For example, the locating of subsequent targets may be determined using the results of operation 320 so that the process of solving for the misalignment of the orientation of the sensor and the orientation of the aircraft does not need to be reproduced.

Finally, in operation 330, the location of the target is determined relative to the Earth. For example, the value of the second variable and/or other variables determined in operation 320 may be used to determine the location of the target relative to the Earth. According to specific example embodiments, operation 330 may determine the location of the target according to WGS84 longitude and geodetic latitude values.

Figure 4:
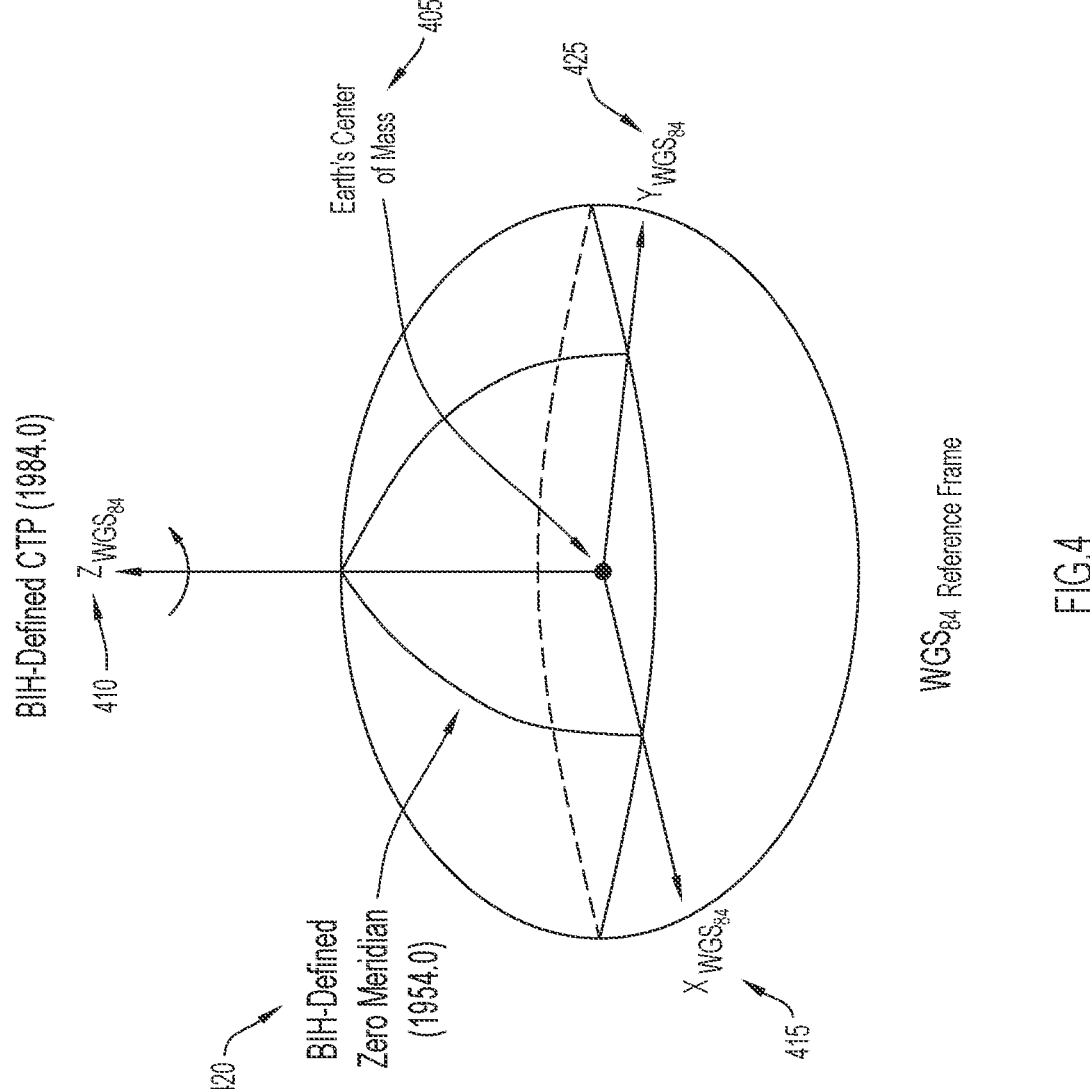
FIG. 4 is an illustration of an Earth-Centered, Earth-Fixed coordinate frame used in the target location and sensor misalignment estimation techniques of the present disclosure, according to an example embodiment.

With reference made to FIG. 4, a specific example embodiment of the techniques of the present disclosure applied to determining a target location utilizing the WGS84 system will be described WGS84 is an Earth-centered, Earth-fixed terrestrial reference system and geodetic datum. WGS84 is based on a consistent set of constants and model parameters that describe the Earth's size, shape, and gravity and geomagnetic fields. WGS84 is the standard U.S. Department of Defense definition of a global reference system for geospatial information and is the reference system for GPS. It is compatible with the International Terrestrial Reference System (ITRS). The current realization WGS84 (G1762) follows the criteria outlined in the International Earth Rotation Service (IERS) Technical Note 21 (TN 21). The reference values for the WGS84 system are as follows, as illustrated in the coordinate system 400 of FIG. 4:

Origin 405: Earth's center of mass being defined for the whole Earth including oceans and atmosphere.

Z-Axis 410: The direction of the IERS Reference Pole (IRP). This direction corresponds to the direction of the Bureau International de l'Heure (BIH) Conventional Terrestrial Pole (CTP) (epoch 1984.0) with an uncertainty of 0.005".

X-Axis 415: Intersection of the IERS Reference Meridian (IRM) 420 and the plane passing through the origin 405 and normal to the Z-Axis 410. The IRM 420 is coincident with the BIH Zero Meridian (epoch 1984.0) with an uncertainty of 0.005".

Y-Axis 425: Completes a right-handed, Earth-Centered Earth-Fixed (ECEF) orthogonal coordinate system.

WGS84 identifies four defining parameters. These are the semi-major axis of the WGS84 ellipsoid, the flattening factor of the Earth, the nominal mean angular velocity of the Earth, and the geocentric gravitational constant as specified below in Table 1

TABLE 1

| Parameter | Notation | Value |
|---|---|---|
| Semi-major Axis | a | 6378137.0 m |
| Flattening Factor of the Earth | 1/f | 298.257223563 |
| Nominal Mean Angular Velocity | $\omega$ | 7292115 10-11 rad/s |
| Geocentric Gravitational Constant | GM | 3986004.418 108 m3/s2 |

According to the present example embodiment, it is assumed that both azimuth and elevation angles are available for geo-location of the aircraft, and the sensor misalignment is defined by a 3-dimensional Euler rotation sequence. Geo-location is performed by simultaneously estimating the target's WGS84 longitude and geodetic latitude and the 3 sensor misalignment angles. Maximum A Posteriori estimation may be used so that limits on the misalignment angle magnitudes may be incorporated. In other words, it may be assumed that the there is an upper limit to the misalignment of the sensor, which places limits on the possible values to be calculated during the simultaneous calculation of the target's WGS84 longitude and geodetic latitude and the 3 sensor misalignment angles. For example, it may be assumed that when the sensor is physically attached to the aircraft, its misalignment will be under a particular threshold value.

In addition to the WGS84 coordinate system illustrated in FIG. 4 (also referred to herein as the ECEF coordinate frame, designated "E" in the equations below), the following coordinate frames are also relevant to the present example embodiment:

Local North-East-Down (NED) coordinate frame at the aircraft (designated "L" in the equations below);

Aircraft body forward-right-down coordinate frame (designated "B" in the equations below);

Assumed sensor frame coordinate frame (designated "A" in the equations below); and Actual sensor frame coordinate frame (designated "C" in the equations below)

As noted above, the ECEF frame E has its z axis through the North Pole, its x axis through the intersection of the equator and the Greenwich Meridian, and its y axis oriented to create a right handed coordinate system. The NED frame L has its x axis directed north along the local longitude line, its y axis directed east, and its z axis directed down along the local vertical. The aircraft body frame B has its x axis directed forward out of the nose of the aircraft, its y axis directed to the right from the pilot's perspective, and its z axis directed down out of the bottom of the aircraft.

If the vector $^{E}P$ is the ECEF position for any object in frame E, then this vector is defined as follows in the WGS84 coordinate system:

$$E_p = \begin{bmatrix} (r_E + a)\cos(\psi)\cos(\theta) \\ (r_E + a)\sin(\psi)\cos(\theta) \\ (r_E(1 - \varepsilon^2) + a)\sin(\theta) \end{bmatrix} \tag{1}$$

7
8 where $\theta$ is the object's geodetic latitude, $\psi$ is its longitude, $\alpha$ is altitude, and $\varepsilon$, which equals 0.08181919, is the Earth's eccentricity. The term $r_E$ used above is the Earth's transverse radius of curvature defined by:

$$r_E = \frac{r_{eq}}{\sqrt{1 - \varepsilon^2 \sin^2(\theta)}} \qquad (2)$$

where $r_{eq}$=6378137 is the Earth's equatorial radius in meters. If $(\theta, \psi, \alpha)$ are known, then the components of $^E P$ may be determined simply by using (1) and (2). However, if the components of $^E P$ are known and $(\theta, \psi, \alpha)$ must be determined, then (1) and (2) must be inverted. This can be done numerically or by using a closed-form solution.

The matrices associated with a rotation $\delta$ about the x, y, or z axis of a coordinate frame are:

$$R(\delta, x) = \begin{bmatrix} 1 & 0 & 0 \\ 0 & \cos(\delta) & -\sin(\delta) \\ 0 & \sin(\delta) & \cos(\delta) \end{bmatrix} \qquad (3)$$

$$R(\delta, y) = \begin{bmatrix} \cos(\delta) & 0 & \sin(\delta) \\ 0 & 1 & 0 \\ -\sin(\delta) & 0 & \cos(\delta) \end{bmatrix} \qquad (4)$$

$$R(\delta, z) = \begin{bmatrix} \cos(\delta) & -\sin(\delta) & 0 \\ \sin(\delta) & \cos(\delta) & 0 \\ 0 & 0 & 1 \end{bmatrix} \qquad (5)$$

Accordingly, the relative orientation of frames E (the ECEF coordinate frame) and L (the NED coordinate frame) is defined in terms of aircraft longitude $\psi$ and geodetic latitude $\theta$ using the following rotation matrix:

$$TEL = R(\psi, z)R\left(-\theta - \frac{\pi}{2}, y\right); \qquad (6)$$

where the "TEL" notation is interpreted to mean the "Transformation from the Frame L to the frame E." In other words, $^E P = TEL \cdot {}^L P$; i.e., the rotation matrix TEL converts a point in the NED coordinate frame to a point in the ECEF coordinate frame. The relative orientation of any two coordinate frames may be found by multiplying the appropriate rotation matrices. For example, the relative orientation of frames E (the ECEF coordinate frame) and B (the aircraft body coordinate frame) is given by TEB=TEL·TLB. Furthermore, the inverse of any rotation matrix is given by its transpose. For example, TLE=[TEL]$^T$.

The relative orientation of frames L (the local NED coordinate frame) and B (the aircraft body coordinate frame) is defined by the following rotation matrix:

$$TLB = R(yaw, z)R(pitch, y)R(roll, x). \qquad (7)$$

The relative orientation of frames B (the aircraft body coordinate frame) and A (the assumed sensor coordinate frame) is defined by the rotation matrix TBA, which is constructed using the assumed mounting angles of the sensor.

The sensor misalignment, i.e., the relative orientation of frames A (the assumed sensor coordinate frame) and C (the actual sensor coordinate frame) is represented by the rotation matrix:

$$TAC = R(\alpha, z)R(\beta, y)R(\gamma, x); \qquad (8)$$

where, as noted above, $\alpha$, $\beta$ and $\gamma$ are the sensor misalignment angles that the techniques of the present example embodiment will estimate in conjunction with location of a target sensed by the sensor.

As explained above with reference to FIGS. 1A-C and 2A-C, the sensor will measure azimuth p and elevation q relative to frame C (the actual sensor coordinate frame). The unit vector directed from the sensor to the target in frame C (i.e., the LOS from the sensor to the target) is:

$$C_u = \begin{bmatrix} \cos(\varphi)\cos(\eta) \\ \sin(\varphi)\cos(\eta) \\ -\sin(\eta) \end{bmatrix}. \qquad (9)$$

This definition of the LOS angles is such that if frame C (the actual sensor coordinate frame) is aligned with frame B (the aircraft body coordinate frame), then a positive azimuth indicates that the target is to the right of the pilot, and a positive elevation indicates that the target is above the pilot. According to the techniques of the present example embodiment, a relationship between the LOS angles of the sensor to the ECEF coordinate frame is determined.

With this background in place, the estimation problem may now be described. Specifically, what is unknown is the location of the target in the ECEF coordinate frame and the sensor misalignment relative to the orientation of the aircraft. Accordingly, if $\psi$ and $\theta$ represent the target's WGS84 or ECEF longitude and geodetic latitude, respectively, then the 5×1 parameter vector of the unknown values to be estimated is:

$$q = \begin{bmatrix} \psi \\ \theta \\ \alpha \\ \beta \\ \gamma \end{bmatrix}, \qquad (10)$$

where $\alpha$, $\beta$ and $\gamma$ are the sensor misalignment angles defined in equation (8), above. In other words, equation (10) defines a 5×1 vector of the values that will be simultaneously solved for using the techniques of the present disclosure—the WGS84 geodetic latitude $\theta$ of the target, the WGS84 longitude V of the target, and the three sensor misalignment values, $\alpha$, $\beta$, and $\gamma$.

To summarize the calculations that follow, the five values to be estimated are the elements of the vector q shown in equation (10), above. The sensor measurements used to estimate these quantities are azimuth and elevation angles determined by the sensor and are the components of the vector z shown in equation (11), below. Equation (12), below, gives the mathematical relationship between sensor measurements and the quantities to be estimated through the vector function h, which is shown implicitly in the derivatives of equations (36)-(39).

More specifically, the problem to be solved is to determine the vector q that best fits the measurements z while accounting for the function h and the statistics of the measurement errors. The optimal value of q is the one that minimizes the objective function shown in equation (18), below. This is sometimes referred to as an "inverse problem" since the objective is to determine q as a function of z, and the given function h is z as a function of q.

The technique used to solve this problem in the following example is Iterated Least-Squares (ILS), which is described with reference to equations (29)-(31), below. ILS is a "batch processing" numerical method where all measurements are processed simultaneously to compute a single solution. The solution consists of an estimate $\hat{q}$ of q (shown in equation (29)), and the estimation error covariance matrix P (shown in equation (31)). This covariance matrix gives the uncertainty in the estimate q.

To solve for the values in q of equation (10), n different sensor values will be used. According to the specific example embodiment, the n different sensor values are embodied as n pairs of azimuth/elevation measurements ($\varphi_i$, $\eta_i$) of sensor values for LOS to a target. The n pairs of sensor values may be stored in the following 2n×1 vector:

$$z = \begin{bmatrix} \varphi_1 \\ \eta_1 \\ \vdots \\ \varphi_n \\ \eta_n \end{bmatrix} \tag{11}$$

Let h(q): $\mathbb{R}^5 \rightarrow \mathbb{R}^{2n}$ be a function that gives the true values of these quantities. Then $$z = h(q) + \varepsilon; \tag{12}$$

where $\varepsilon$ is a 2n×1 vector of measurement errors. For purposes of the present example embodiment, it is assumed that the measurement errors are Gaussian, zero-mean, and uncorrelated. As a result:

$$\varepsilon \sim \mathcal{N}(0, R); \tag{13}$$

where R is a known 2n×2n diagonal positive definite measurement error covariance matrix having the following form:

$$R = \begin{bmatrix} \sigma_1^2 & 0 & \dots & 0 \\ 0 & \sigma_2^2 & \ddots & \vdots \\ \vdots & \ddots & \ddots & 0 \\ 0 & \dots & 0 & \sigma_{2n}^2 \end{bmatrix} \tag{14}$$

According to the techniques of the present example embodiment, the unknown parameter vector q is not treated as a constant, but as random variable with a known a priori distribution:

$$q \sim \mathcal{N}(\mu, Q); \tag{15}$$

where Q is a diagonal positive definite matrix. Also according to the techniques of the present example embodiment, q and the measurement error vector $\varepsilon$ are uncorrelated, so that $$E[q\varepsilon^T] = 0; \tag{16}$$

where E[•] is the statistical expectation operator. As understood by the skilled artisan, the Maximum A Posteriori (MAP) estimate of q is given by:

$$\hat{q} = \arg\min_q g(q); \tag{17}$$

where:

$$g(q) = \frac{1}{2}(z - h(q))^T R^{-1}(z - h(q)) + \frac{1}{2}(q - \mu)^T Q^{-1}(q - \mu) \tag{18}$$

This function g(q) is the objective function to be minimized using the numerical techniques of the present example embodiment.

As indicated above, the objective function g(q) of equation (18) is a function of q. As also noted above in equation (15), q may have a Gaussian or normal distribution. It will now be described how the apriori distribution of equation (15) of the parameter vector q given in equation (10) is constructed. According to the present example embodiment, the a priori mean and covariance of q are provided as follows:

$$\mu = \begin{bmatrix} \mu_1 \\ \mu_2 \\ \mu_3 \\ \mu_4 \\ \mu_5 \end{bmatrix}; \text{ and} \tag{19}$$

$$Q = \begin{bmatrix} Q_{11} & 0 & 0 & 0 & 0 \\ 0 & Q_{22} & 0 & 0 & 0 \\ 0 & 0 & Q_{33} & 0 & 0 \\ 0 & 0 & 0 & Q_{44} & 0 \\ 0 & 0 & 0 & 0 & Q_{55} \end{bmatrix}. \tag{20}$$

For purposes of the present example embodiment, it is assumed that the magnitude of each misalignment value, $\alpha$, $\beta$, and $\gamma$, may lie anywhere between zero and some known maximum possible value, such as 5°. Since each misalignment value is assumed to have a Gaussian distribution, it is assumed that the maximum possible value of each misalignment is "3-sigma." Accordingly:

$$\mu_3 = \mu_4 = \mu_5 = 0; \tag{21}$$

$$Q_{33} = \left(\frac{\text{maximum possible } \alpha \text{ magnitude}}{3}\right)^2; \tag{22}$$

$$Q_{44} = \left( \frac{\text{maximum possible } \beta \text{ magnitude}}{3} \right)^2; \text{ and} \tag{23}$$

$$Q_{55} = \left( \frac{\text{maximum possible } \gamma \text{ magnitude}}{3} \right)^2. \tag{24}$$

In general, there will be no a priori information on the target location. For MAP estimation, this may be modelled as:

$$\mu_1 = \mu_2 = 0; \text{ and} \tag{25}$$

$$Q_{11} = Q_{22} = \infty. \tag{26}$$

As will be described in detail below, the numerical method used to solve the estimation problem of the present example embodiment does not require Q, but requires $Q^{-1}$. Therefore, the a priori distribution for q will be defined using:

$$\mu = \begin{bmatrix} 0 \\ 0 \\ 0 \\ 0 \\ 0 \end{bmatrix}; \text{ and} \tag{27}$$

$$Q^{-1} = \begin{bmatrix} 0 & 0 & 0 & 0 & 0 \\ 0 & 0 & 0 & 0 & 0 \\ 0 & 0 & \frac{1}{Q_{22}} & 0 & 0 \\ 0 & 0 & 0 & \frac{1}{Q_{44}} & 0 \\ 0 & 0 & 0 & 0 & \frac{1}{Q_{55}} \end{bmatrix}. \tag{28}$$

With u and $Q^{-1}$ determined as set forth above, an ILS method is used to determine the solution for equations (17) and (18) above, and this solution is provided by:

$$\hat{q}_{k+1} = \tag{29}$$
$$\hat{q}_k + \left[ H(\hat{q}_k)^T R^{-1} H(\hat{q}_k) + Q^{-1} \right]^{-1} \left( H(\hat{q}_k)^T R^{-1}(z - h(\hat{q}_k)) - Q^{-1}(\hat{q}_k - \mu) \right);$$

where $H(\hat{q}_k)$ is the 2n×5 gradient matrix of the function h, provided as follows:

$$H(\hat{q}_k) = \frac{\partial h}{\partial q}(\hat{q}_k) \tag{30}$$

The estimation error covariance matrix at the $k^{th}$ step is:

$$P_k = E\left[ (q - \hat{q}_k)(q - \hat{q}_k)^T \right] = \left[ H(\hat{q}_k)^T R^{-1} H(\hat{q}_k) + Q^{-1} \right]^{-1}. \tag{31}$$

As will be shown through the development below, the gradient matrix H needed for the ILS method, may now be determined.

With respect to the gradient matrix H, each row of the gradient matrix H is the derivative of either azimuth φ or elevation η, the values determined by the sensor, with respect to the parameter vector q. Therefore, the gradient matrix H may be determined. These derivatives may be partitioned as follows:

$$\frac{\partial_\varphi}{\partial_q} = \left[ \frac{\partial_\varphi}{\partial(\psi, \theta)} \quad \frac{\partial_\varphi}{\partial(\alpha, \beta, \gamma)} \right]; \text{ and} \tag{32}$$

$$\frac{\partial_n}{\partial_q} = \left[ \frac{\partial_n}{\partial(\psi, \theta)} \quad \frac{\partial_n}{\partial(\alpha, \beta, \gamma)} \right]. \tag{33}$$

To compute these derivatives, the sensor and target positions in the ECEF coordinate frame are given by $p_S$ and $p_T$, respectively. Accordingly, the relative position vector from the sensor to the target is:

$$p = p_T - p_S. \tag{34}$$

The unit vector from the sensor to the target (i.e., the LOS from the sensor to the target), is determined as follows:

$$u = \left\| \frac{p}{p} \right\|. \tag{35}$$

For example, the above unit vector when represented using LOS angles in frame C (the actual sensor coordinate frame) was given in equation (9). The chain rule of differentiation may be used to construct the terms in (32) and (33) above, as follows:

$$\frac{\partial \varphi}{\partial(\psi, \theta)} = \frac{\partial \varphi}{\partial^C u} \cdot \frac{\partial^C u}{\partial^C p} \cdot \frac{\partial^C p}{\partial^e P} \cdot \frac{\partial^E p}{\partial^E p_T} \cdot \frac{\partial^E p_T}{\partial(\psi, \theta)}; \tag{36}$$

$$\frac{\partial \varphi}{\partial(\alpha, \beta, \gamma)} = \frac{\partial \varphi}{\partial^C u} \cdot \frac{\partial^C u}{\partial(\alpha, \beta, \gamma)}; \tag{37}$$

$$\frac{\partial \eta}{\partial(\psi, \theta)} = \frac{\partial \eta}{\partial^C u} \cdot \frac{\partial^C u}{\partial^C p} \cdot \frac{\partial^C p}{\partial^E p} \cdot \frac{\partial^E p}{\partial^E p_T} \cdot \frac{\partial^E p_T}{\partial(\psi, \theta)}; \text{ and} \tag{38}$$

$$\frac{\partial \eta}{\partial(\alpha, \beta, \gamma)} = \frac{\partial \eta}{\partial^C u} \cdot \frac{\partial^C u}{\partial(\alpha, \beta, \gamma)}. \tag{39}$$

The above derivatives of equations (36)-(39) are computed using only the current sensor position and the current estimate of the parameter vector q. The LOS angle measurements are not used in these computations. These derivatives are needed to construct the gradient matrix H shown in equation (30), which in turn is required by the ILS algorithm used to compute the parameter vector q shown in equation (10).

What follows is a determination of the terms need for equations (36)-(39).

First, using the definition of cu given in equation (9) provides the following:

$$\tan(\varphi) = \frac{c_{u(2)}}{c_{u(1)}}; \text{ and} \tag{40}$$

$$\sin(\eta) = -c_u(3). \tag{41}$$

Equations (40) and (41), in turn, give the following:

$$\frac{\partial \varphi}{\partial^C u} = \frac{1}{\cos(\eta)}[\ -\sin(\varphi)\ \ \cos(\varphi)\ \ 0\ ]; \text{ and} \tag{42}$$

$$\frac{\partial \eta}{\partial^C u} = \frac{1}{\cos(\eta)}[\ 0\ \ 0\ \ -1\ ]. \tag{43}$$

The expressions of equations (42) and (43) are the first terms in equations (36)-(37) and (38)-(39), respectively.

As would be understood by the skilled artisan, if $$u = \frac{p}{\|p\|}, \tag{44}$$

then, for any nonzero vector p:

$$\frac{\partial u}{\partial p} = \frac{1}{\|p\|}[I - uu^T]; \tag{45}$$

where I is the 3×3 identity matrix.

Therefore, in frame C:

$$\frac{\partial^C u}{\partial^C p} = \frac{1}{\|^C p\|}[1 - {}^C u {}^C u^T]; \tag{46}$$

where $\|c_p\|$ is the range from the sensor to the target. Equation (46) gives the second term in equations (36) and (38).

In order to determine the position vectors, we know from above that a position in coordinate frame C (the actual sensor frame) is given by the transformation TCE applied to the point in the coordinate from E (the ECEF frame):

$$c_p = TCE \cdot E_p. \tag{47}$$

Therefore:

$$\frac{\partial^C p}{\partial^E p} = TCE = TCA \cdot TAB \cdot TBL \cdot TLE. \tag{48}$$

And:

$$E_p = E_{p_T} - E_{p_S}; \tag{49}$$

which gives that:

$$\frac{\partial^E p}{\partial^E p_T} = I. \tag{50}$$

Equations (48) and (50) give the third and fourth terms in equations (36) and (38).

To simplify the differentiation of equation (1) above, the following equation may be used:

$$E_{p_T} = au + r_{E^v} \tag{51}$$

where:

$$u = \begin{bmatrix} \cos(\psi)\cos(\theta) \\ \sin(\psi)\cos(\theta) \\ \sin(\theta) \end{bmatrix}; \text{ and} \tag{52}$$

$$v = \begin{bmatrix} \cos(\psi)\cos(\theta) \\ \sin(\psi)\cos(\theta) \\ (1 - \varepsilon^2)\sin(\theta) \end{bmatrix}. \tag{53}$$

The derivative need in equations (36) and (38) is:

$$\frac{\partial^E p_T}{\partial(\psi, \theta)} = \begin{bmatrix} \frac{\partial^E p_T}{\partial \psi} & \frac{\partial^E p_T}{\partial \theta} \end{bmatrix} \tag{54}$$

The 3×2 matrix shown in equation (54) is the fifth term in equations (36) and (38). Using equation (2) and (51)-(53) gives:

$$\frac{\partial^E p_T}{\partial \psi} = a\left(\frac{\partial u}{\partial \psi}\right) + r_E\left(\frac{\partial v}{\partial \psi}\right); \text{ and} \tag{55}$$

$$\frac{\partial^E p_T}{\partial \theta} = a\left(\frac{\partial u}{\partial \theta}\right) + r_E\left(\frac{\partial v}{\partial \theta}\right) + \left(\frac{\partial r_E}{\partial \theta}\right)v; \tag{56}$$

where:

$$\frac{\partial u}{\partial \psi} = \frac{\partial v}{\partial \psi} = \begin{bmatrix} -\sin(\psi)\cos(\theta) \\ \cos(\psi)\cos(\theta) \\ 0 \end{bmatrix}; \tag{57}$$

$$\frac{\partial u}{\partial \theta} = \begin{bmatrix} -\cos(\psi)\sin(\theta) \\ -\sin(\psi)\sin(\theta) \\ \cos(\theta) \end{bmatrix};$$ (58)

$$\frac{\partial v}{\partial \theta} = \begin{bmatrix} -\cos(\psi)\sin(\theta) \\ -\sin(\psi)\sin(\theta) \\ (1 - \epsilon^2)\cos(\theta) \end{bmatrix}; \text{ and}$$ (59)

$$\frac{\partial r_E}{\partial \theta} = r_{eq}\epsilon^2\sin(\theta)\cos(\theta)\left(1 - \epsilon^2\sin^2(\theta)\right)^{-3/2}.$$ (60)

The derivative needed in (37) and (39) is:

$$\frac{\partial^C u}{\partial(\alpha, \beta, \gamma)} = \begin{bmatrix} \frac{\partial^C u}{\partial \alpha} & \frac{\partial^C u}{\partial \beta} & \frac{\partial^C u}{\partial \gamma} \end{bmatrix}.$$ (61)

This 3×3 matrix is the second term in equations (37) and (39). By definition:

$$c_u = TCA \cdot A_u$$ (62)

Substituting equation (8) into equation (62) gives:

$$c_u = [R(\alpha, z)R(\beta, y)R(\gamma, x)]^T \cdot A_u.$$ (63)

Differentiating equation (63) gives:

$$\frac{\partial^C u}{\partial \alpha} = \left[\frac{\partial R(\alpha, z)}{\partial \alpha}R(\beta, y)R(\gamma, x)\right]^T \cdot {}^A u;$$ (64)

$$\frac{\partial^C u}{\partial \beta} = \left[R(\alpha, z)\frac{\partial R(\beta, y)}{\partial \beta}R(\gamma, x)\right]^T \cdot {}^A u; \text{ and}$$ (65)

$$\frac{\partial^C u}{\partial \gamma} = \left[R(\alpha, z)R(\beta, y)\frac{\partial R(\gamma, x)}{\partial \gamma}\right]^T \cdot {}^A u$$ (66)

From equations (3)-(5) we have the following derivatives needed in (64)-(66):

$$\frac{\partial R(\alpha, z)}{\partial \alpha} = \begin{bmatrix} -\sin(\alpha) & -\cos(\alpha) & 0 \\ \cos(\alpha) & -\sin(\alpha) & 0 \\ 0 & 0 & 0 \end{bmatrix};$$ (67)

$$\frac{\partial R(\beta, y)}{\partial \beta} = \begin{bmatrix} -\sin(\beta) & 0 & \cos(\beta) \\ 0 & 0 & 0 \\ -\cos(\beta) & 0 & -\sin(\beta) \end{bmatrix}; \text{ and}$$ (68)

$$\frac{\partial R(\gamma, x)}{\partial \gamma} = \begin{bmatrix} 0 & 0 & 0 \\ 0 & -\sin(\gamma) & -\cos(\gamma) \\ 0 & \cos(\gamma) & -\sin(\gamma) \end{bmatrix}.$$ (69)

According to specific scenarios, there may be situations where only the aircraft azimuth $\varphi$ data is available. In such situations, it may be difficult to estimate the misalignment angles $\beta$ and $\gamma$. Accordingly, when only azimuth $\varphi$ data for the aircraft is available, it may be beneficial to simplify equation (8) to:

$$TAC = R(\alpha, z).$$ (70)

It may also be beneficial to simplify equation (9) to:

$$c_u = \begin{bmatrix} \cos(\varphi) \\ \sin(\varphi) \\ 0 \end{bmatrix}.$$ (71)

Using these simplifications, equations (70) and (71) give that:

$$^A u = TAC \cdot {}^C u = \begin{bmatrix} \cos(\varphi + \alpha) \\ \sin(\varphi + \alpha) \\ 0 \end{bmatrix}.$$ (72)

Therefore:

$$\varphi = A_\varphi - \alpha;$$ (73)

where $^A\varphi$ is the azimuth angle measurement in frame A. In this situation, the misalignment angle $\alpha$ is equivalent to an azimuth measurement bias.

As noted above, the previous example solved for the target location and sensor misalignment values using an ILS method. An alternative method utilizing a Kalman filter method will now be described.

A Kalman filter provides a solution that is statistically equivalent to the one computed by ILS, but it is a recursive algorithm. Each measurement is processed individually to produce a sequence of solutions, where each filter output is a refinement of the previous output. A Kalman filter is simply a recursive implementation of ILS. The advantages of a Kalman filter when compared to ILS are that it requires less data storage and the code developed for implementation is simpler and faster. The advantages of ILS are that it does not require a value of the covariance matrix P for initialization and is often more stable.

As with the ILS example above, the present Kalman filter example embodiment, utilizes n azimuth and n elevation sensor measurements, so the vector z in equations (11) and (12) has 2n components.

A Kalman filter solution is computed using the following three steps for each of k=1, 2, . . . , 2n:

$$K_k = P_{k-1} H_k^T \left( H_k P_{k-1} H_k^T + \sigma_k^2 \right)^{-1} \qquad (74)$$

$$\hat{q}_k = \hat{q}_{k-1} + K_k(z_k - h(\hat{q}_{k-1})) \qquad (75)$$

$$P_k - (I - K_k H_k) P_{k-1} \qquad (76)$$

This recursion requires initial values $\hat{q}_0$ and $P_0$. The final outputs from the Kalman filter after processing all 2n measurements are $\hat{q}_{2n}$ and $P_{2n}$. These are the values to be compared with those computed by ILS.

In equation (74) above, $H_k$ is equivalent to row k of the matrix H shown in equation (30), above. The value $$\sigma_k^2$$

is the measurement error variance in position (k, k) of the matrix R shown in equation (14), above. In equation (75), $z_k$ is element k of the vector z in equations (11) and (12), above, and h is the function in row k of the vector function h(q) shown in equation (12), above. In (76), I is the 5×5 identity matrix.

In addition to the ILS and Kalman filter techniques described above, a grid search method may be used to implement the techniques of the present disclosure. Grid search is a type of hyperparameter optimization. Specifically, grid search is a process that searches exhaustively through a manually specified subset of the hyperparameter space of the targeted algorithm. One specific grid search example embodiment of the techniques of the present disclosure may be implemented through the following operations.

First, a set of target locations and sensor misalignment angles are defined for consideration. These are the components of the 5×1 vector q shown in equation (10). Each grid point is an estimate q of q, as discussed above.

Second, at each grid point, the expected azimuth and elevation angle values are determined. These are the elements of the 2n×1 vector h(q̂) shown in equation (29), where the function h was introduced in equation (12).

Third, at each grid point, the quantity $(z-h(\hat{q}))^T R^{-1} (z-h(\hat{q}))$ is calculated where z is the 2n×1 vector of measurements shown in equation (11) and R is the 2n×2n measurement error covariance matrix shown in equation (14). Finally, the grid point having the smallest value of this quantity is selected. The selected grid point gives the estimated target location and sensor misalignment angles.

Advantages of a grid search algorithm when compared to ILS or a Kalman filter methods may include:

1. A robust and stable algorithm—divergence is not possible.
2. Grid search methods may not require an initial estimate of the parameter vector or an initial covariance matrix.
3. Grid search methods may not require the computation of the gradient matrix H developed above, except for construction of the covariance matrix P at the selected grid point.

On the other hand, the grid search set may not contain the true parameter values and the computation time needed to implement a grid search method may be long for finely-spaced grid points, which are required for accurate parameter estimation.

Figure 5:
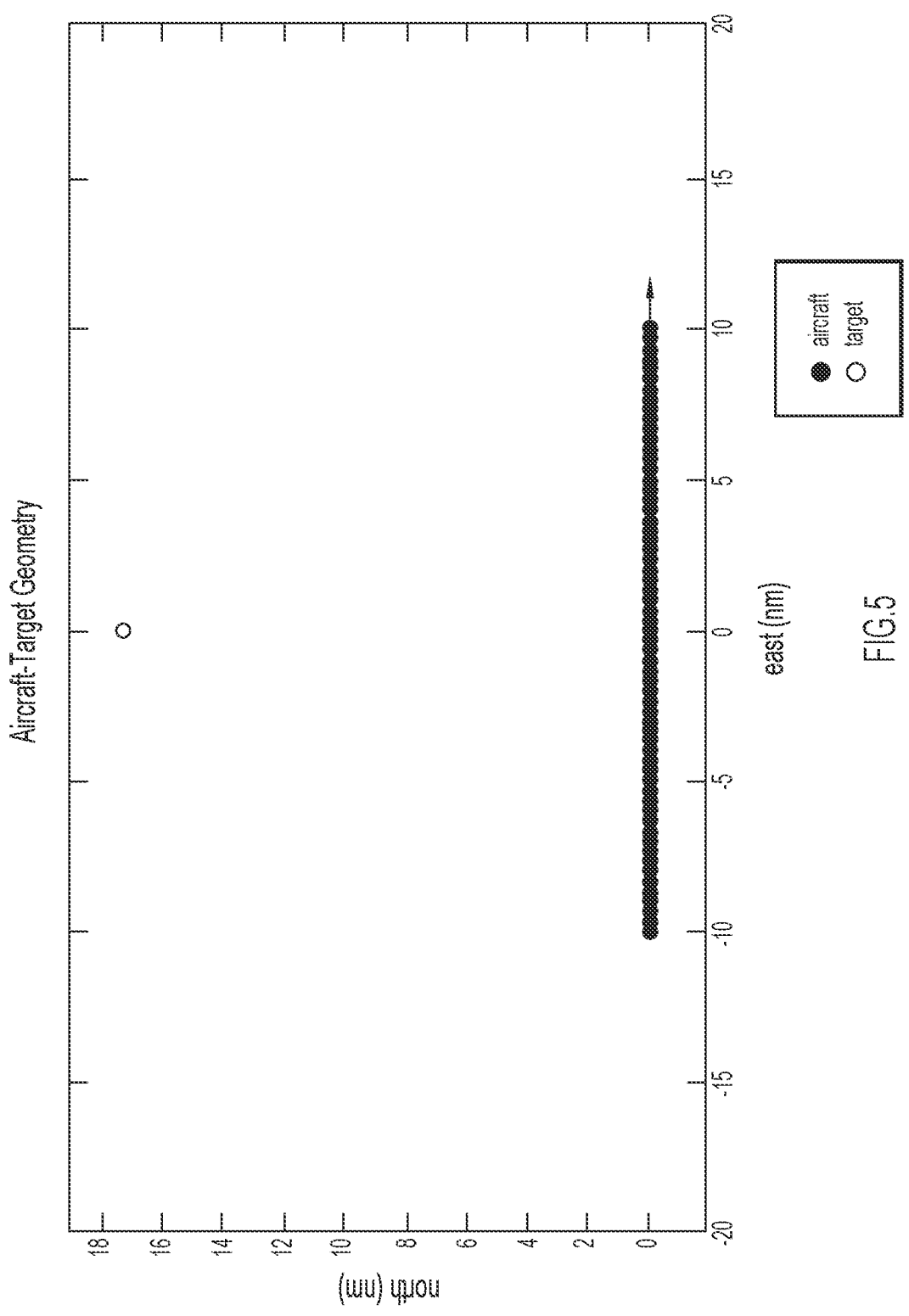
FIG. 5 is a two-dimensional plot of an aircraft's location and a target's location used in a simulation of the target location and sensor misalignment estimation techniques of the present disclosure, according to an example embodiment.
Figure 6:
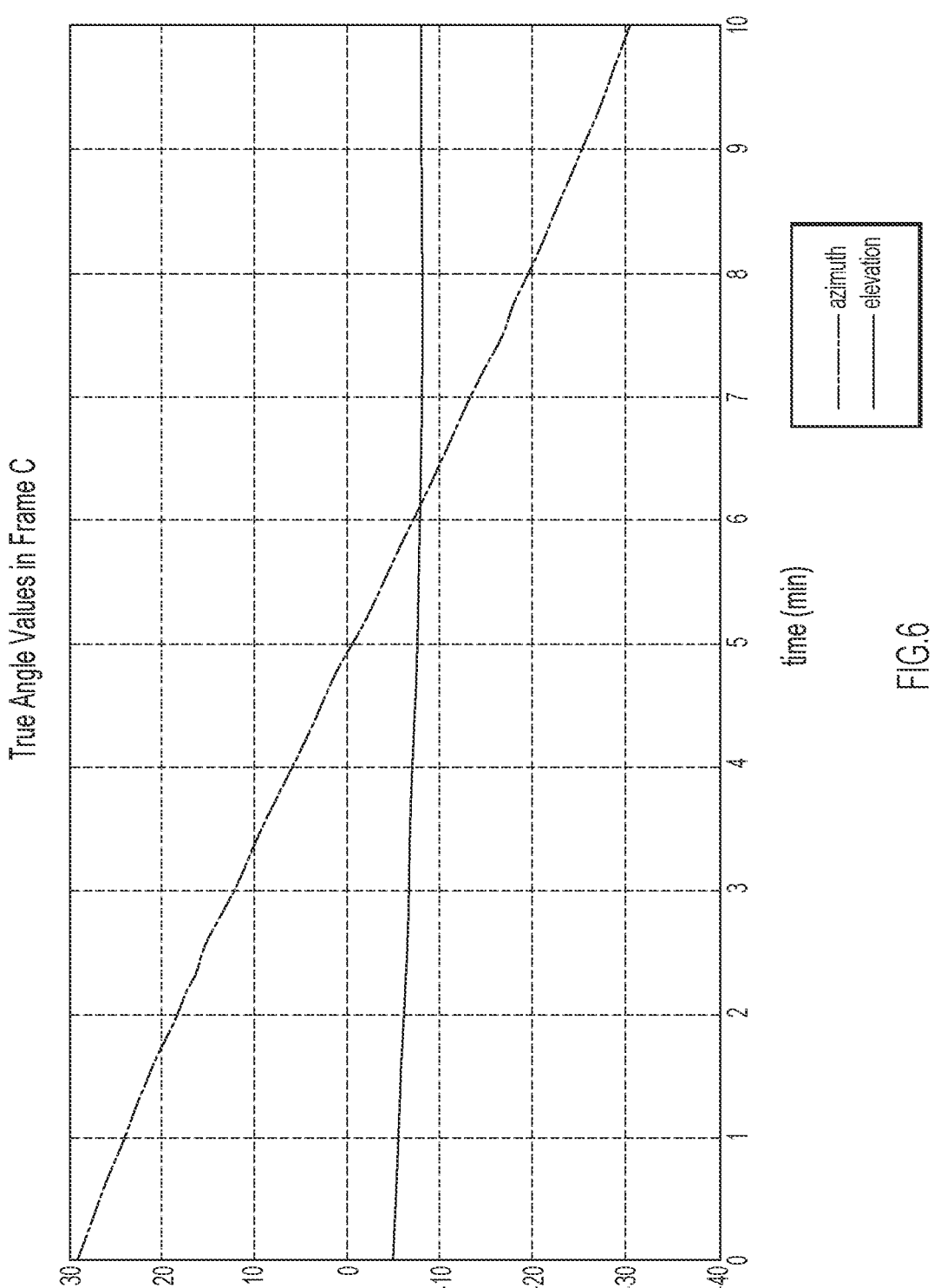
FIG. 6 is a plot of actual azimuthal and elevation angles versus time that are used in a simulation of the target location and sensor misalignment estimation techniques of the present disclosure, according to an example embodiment.
Figure 7:
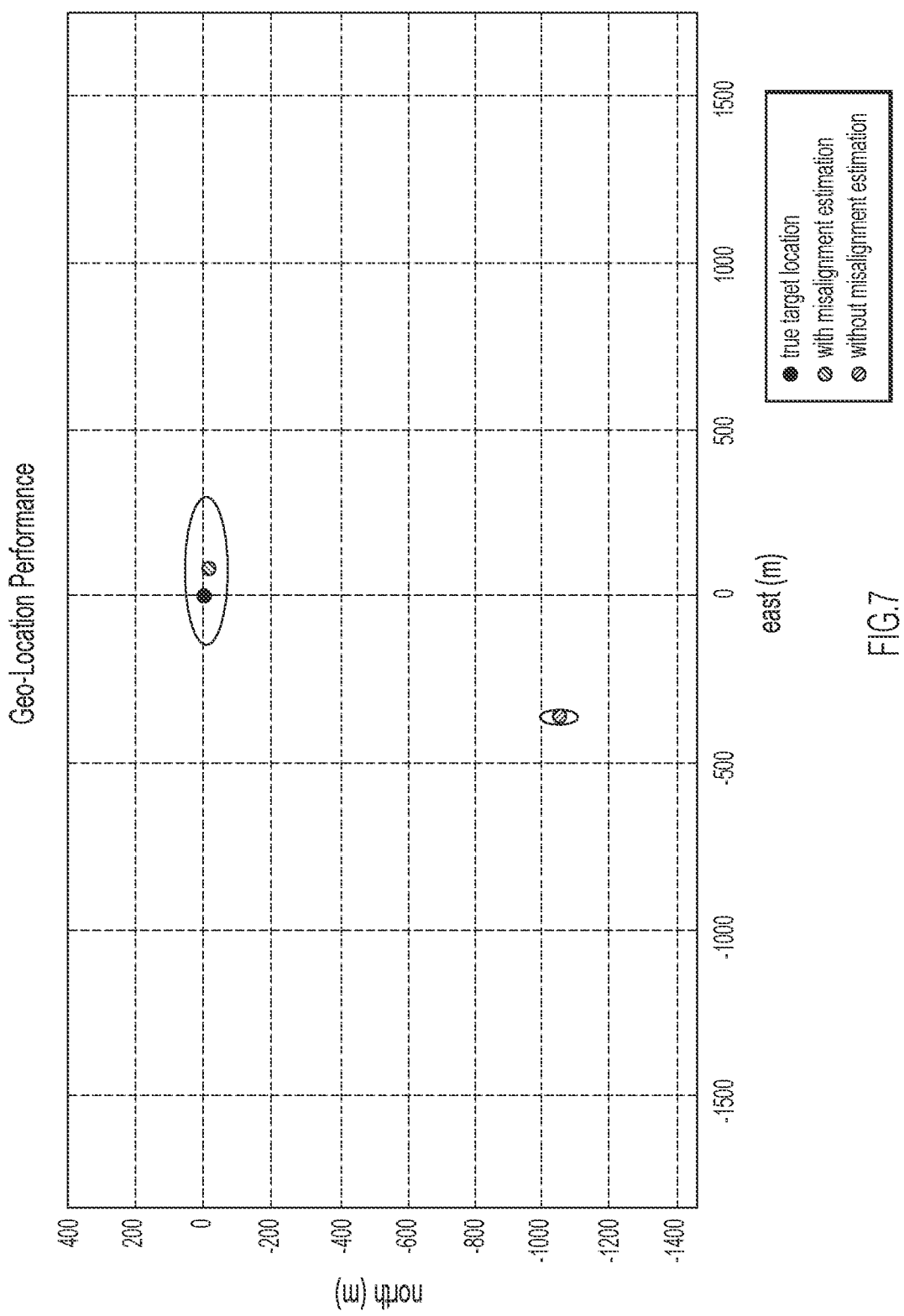
FIG. 7 is a two-dimensional plot comparing an actual target location, a target location calculated using the target location and sensor misalignment estimation techniques of the present disclosure, according to an example embodiment, and a target location calculated without using the target location and sensor misalignment estimation techniques of the present disclosure.

With reference now made to FIGS. 5-7, a simulation applying the techniques of the present disclosure is described, in which the accuracy of the techniques is confirmed. Specifically, Matlab® was used to simulate the application of the techniques of the present disclosure to an Unmanned Aerial Vehicle (UAV) locating a stationary ground target with azimuth and elevation angle measurement.

The parameters defining the scenario being simulated are given in Table 2, below.

TABLE 2

| | |
|---|---|
| Initial range from target to aircraft (nautical miles) | 20 |
| Initial bearing from target to aircraft (deg) | −150 |
| Aircraft speed (knots) | 120 |
| Aircraft heading (deg) | 90 |
| Aircraft altitude (ft) | 10,000 |
| Target altitude (ft) | 200 |
| Time of flight (min) | 10 |

The aircraft-target geometry is shown in FIG. 5, with the WGS84 quantities projected onto a plane tangent to the Earth's surface at the average aircraft position.

According to the simulation, the sensor is an antenna array mounted on the left side of the aircraft with an assumed orientation defined by TBA=R(−π/2, z), as illustrated in FIGS. 1A-C and 2A-C. The actual sensor array orientation is defined by equation (8) above (reproduced below).

$$TAC = R(\alpha, z) R(\beta, y) R(\gamma, x). \qquad (8)$$

The values of the misalignment angles α, β, and γ, the maximum misalignment angle value, and the angle measurement parameters are given by Table 3, below.

TABLE 3

| | |
|---|---|
| α (deg) | 1 |
| β (deg) | 2 |
| γ (deg) | 3 |
| Maximum possible value for α, β, and γ during estimation (deg) | 5 |
| Time between measurements (sec) | 10 |
| Azimuth and elevation measurement error sigma (deg) | 0.1 |

The true azimuth and elevation angle values in frame C (i.e., the actual sensor coordinate frame) are shown in FIG. 6.

Given these values, geo-location of the target was performed according to the ILS techniques of the present disclosure and compared with geolocation performed without using the misalignment estimation techniques of the present disclosure (i.e., geo-location was performed with only target longitude and latitude in the parameter vector q of equation (10), above; α, β, and γ were not included).

Geo-location and misalignment angle estimation performance values are given in Table 4, below. FIG. 7 shows the target location estimates and 95% confidence error ellipses. As illustrated in Table 4 and FIG. 7, the use of misalignment estimation techniques of the present disclosure significantly improve geo-location performance in terms of miss distance and error ellipse containment.

TABLE 4

|  | With Misalignment Estimation | Without Misalignment Estimation |
| --- | --- | --- |
| Miss distance (m) | 78 | 1115 |
| 95% elliptical error probable (m) | 222 | 56 |
| Ellipse contain target? | Yes | nc |
| α estimation error (deg) | 0.11 | n/a |
| β estimation error (deg) | 0.03 | n/a |
| γ estimation error (deg) | 0.00 | n/a |

Figure 8:
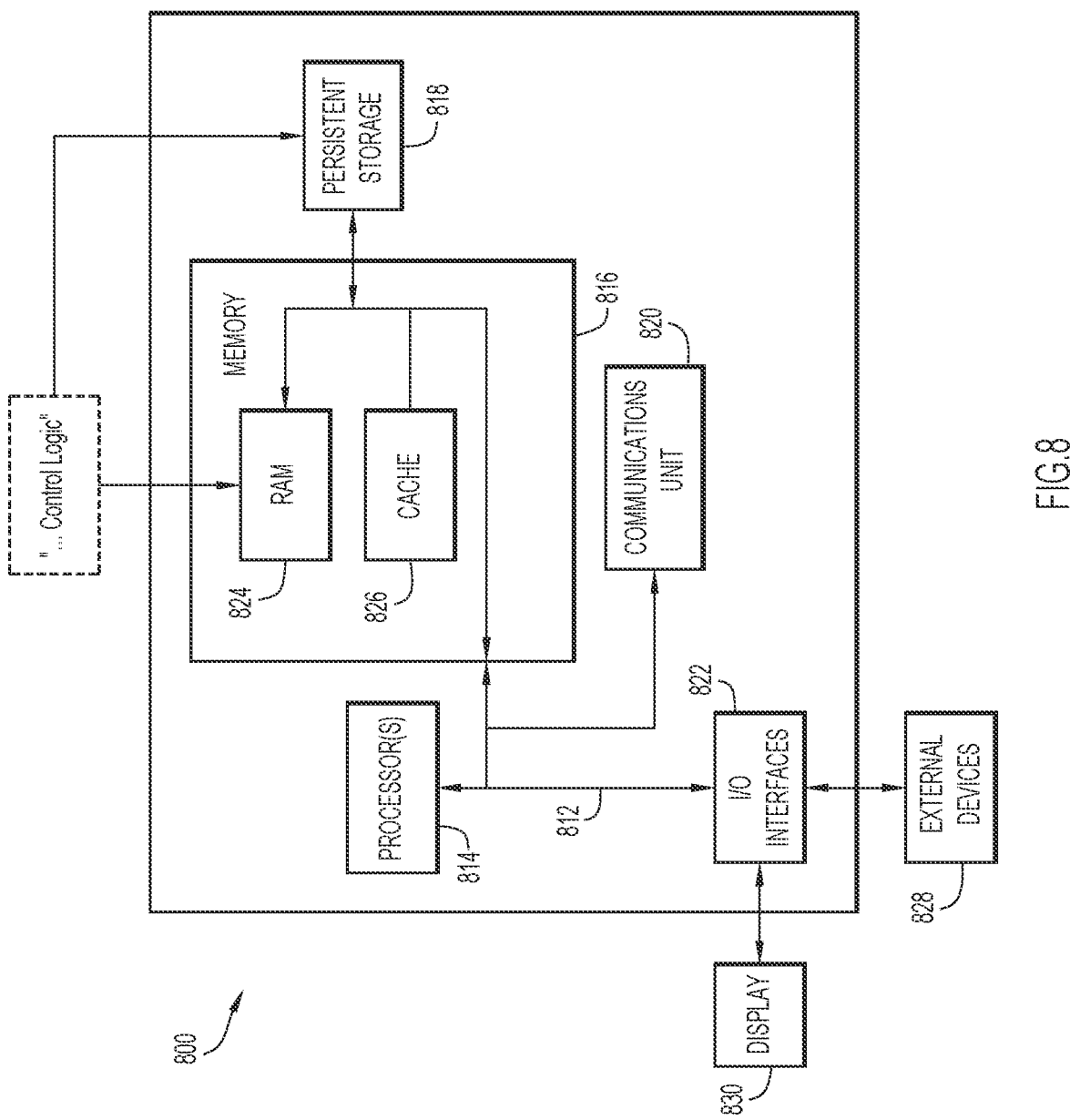
FIG. 8 is a functional block diagram of a processing apparatus configured to implement the target location and sensor misalignment estimation techniques of the present disclosure, according to an example embodiment.

With reference now made to FIG. 8, illustrated therein a hardware block diagram of a computing device 800 that may perform the sensor misalignment estimation techniques of the present disclosure. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses. I/O interfaces 822 may be configured to receive data from external devices 828. Examples of such external devices may include the sensors and/or aircraft navigation systems described above with reference to FIGS. 1A-C and 2A-C.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the non-classical imaging techniques of the present disclosure may be stored in memory 816 or persistent storage 818 for execution by processor(s) 814. The control logic stored in memory 816 or persistent storage 818 may implement the non-classical imaging techniques of the present disclosure. Additionally, memory 816 and/or persistent storage 818 may store the data received from, for example, the sensors and/or aircraft navigation systems described above with reference to FIGS. 1A-C and 2A-C.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links. Finally, computing device 800 may include an optional display 830.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising operations performed by one or more processors, the operations comprising:
   obtaining, from a sensor mounted on an aircraft, first line of sight data indicative of a first line of sight from the sensor to a stationary target with an unknown location on the Earth by navigating the aircraft relative to the target;
   obtaining, from a navigation system associated with the aircraft, first orientation data indicative of an orientation of the aircraft relative to the Earth when obtaining the first line of sight data;
   obtaining, from the sensor, second line of sight data indicative of a second line of sight from the sensor to the target;
   obtaining, from the navigation system associated with the aircraft, second orientation data indicative of an orientation of the aircraft relative to the Earth when obtaining the second line of sight data by navigating the aircraft relative to the target;
   generating an expression coupling a first variable indicative of misalignment of an orientation of the sensor relative to the orientation of the aircraft and a second variable indicative of a location of the target relative to the Earth;
   simultaneously determining a value of the first variable and a value of the second variable using the first line of sight data, the second line of sight data, the first orientation data, the second orientation data and the expression coupling the first variable and the second variable by finding the value of the first variable and the value of the second variable that satisfy the expression by placing an upper limit on values that may be determined for the value of the first variable and numerically solving using an Iterated-Least Squares method;
   compensating for the misalignment of the orientation of the sensor and the orientation of the aircraft using the value of the first variable to correct sensor data for the misalignment of the orientation of the sensor relative to the orientation of the aircraft by correcting line of sight data to a subsequent target acquired by the sensor; and
   determining the unknown location of the target relative to the Earth using the value of the second variable.

2. The method of claim 1, wherein determining the location of the target relative to the Earth comprises determining the location of the target in a World Geodetic System coordinate system.

3. The method of claim 1, wherein the value of the first variable indicates a rotation angle of the orientation of the sensor relative to the orientation of the aircraft.

4. An apparatus comprising:

a navigation system associated with an aircraft;

a sensor mounted to an aircraft; and one or more processors, wherein the one or more processors are configured to:

obtain, from the sensor mounted on the aircraft, first line of sight data indicative of a first line of sight from the sensor to a stationary target with an unknown location on the Earth by navigating the aircraft relative to the target;

obtain, from the navigation system, first orientation data indicative of an orientation of the aircraft relative to the Earth when obtaining the first line of sight data;

obtain, from the sensor mounted on the aircraft, second line of sight data indicative of a second line of sight from the sensor to the target by navigating the aircraft relative to the target;

obtain, from the navigation system, second orientation data indicative of an orientation of the aircraft relative to the Earth when obtaining the second line of sight data;

generate an expression coupling a first variable indicative of misalignment of an orientation of the sensor relative to the orientation of the aircraft and a second variable indicative of a location of the target relative to the Earth;

simultaneously determine a value of the first variable and a value of the second variable using the first line of sight data, the second line of sight data, the first orientation data, the second orientation data and the expression coupling the first variable and the second variable by finding the value of the first variable and the value of the second variable that satisfy the expression by placing an upper limit on values that may be determined for the value of the first variable and numerically solving using an Iterated-Least Squares method;

compensate for the misalignment of the orientation of the sensor and the orientation of the aircraft using the value of the first variable to correct sensor data for the misalignment of the orientation of the sensor relative to the orientation of the aircraft by correcting line of sight data to a subsequent target acquired by the sensor; and determine the unknown location of the target relative to the Earth using the value of the second variable.

5. The apparatus of claim 4, wherein the one or more processors are configured to determine the location of the target relative to the Earth by determining the location of the target in a World Geodetic System coordinate system.

6. The apparatus of claim 4, wherein the value of the first variable indicates a rotation angle of the orientation of the sensor relative to the orientation of the aircraft.

7. One or more tangible, non-transitory computer readable mediums encoded with instructions, wherein the instructions, when executed by one or more processors, are operable to:

obtain, from a sensor mounted on an aircraft, first line of sight data indicative of a first line of sight from the sensor to a stationary target with an unknown location on the Earth by navigating the aircraft relative to the target;

obtain, from a navigation system associated with the aircraft, first orientation data indicative of an orientation of the aircraft relative to the Earth when obtaining the first line of sight data;

obtain, from the sensor mounted on the aircraft, second line of sight data indicative of a second line of sight from the sensor to the target by navigating the aircraft relative to the target;

obtain, from the navigation system, second orientation data indicative of an orientation of the aircraft relative to the Earth when obtaining the second line of sight data;

generate an expression coupling a first variable indicative of misalignment of an orientation of the sensor relative to the orientation of the aircraft and a second variable indicative of a location of the target relative to the Earth;

simultaneously determine a value of the first variable and a value of the second variable using the first line of sight data, the second line of sight data, the first orientation data, the second orientation data and the expression coupling the first variable and the second variable by finding the value of the first variable and the value of the second variable that satisfy the expression by placing an upper limit on values that may be determined for the value of the first variable and numerically solving using an Iterated-Least Squares method;

compensate for the misalignment of the orientation of the sensor and the orientation of the aircraft using the value of the first variable to correct sensor data for the misalignment of the orientation of the sensor relative to the orientation of the aircraft by correcting line of sight data to a subsequent target acquired by the sensor; and determine the unknown location of the target relative to the Earth using the value of the second variable.

8. The one or more tangible, non-transitory computer readable mediums of claim 7, wherein instructions operable to determine the location of the target relative to the Earth comprise instructions to determine the location of the target in a World Geodetic System coordinate system.

* * * * *